(12) United States Patent
Sugata et al.

(10) Patent No.: US 11,469,875 B2
(45) Date of Patent: Oct. 11, 2022

(54) COMMUNICATION SYSTEM AND CONTROL METHOD

(71) Applicant: TOYOTA JIDOSHA KABUSHIKI KAISHA, Toyota (JP)

(72) Inventors: Hikaru Sugata, Tokyo (JP); Eiji Mitsuda, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 17/065,652

(22) Filed: Oct. 8, 2020

(65) Prior Publication Data

US 2021/0160042 A1 May 27, 2021

(30) Foreign Application Priority Data

Nov. 22, 2019 (JP) .............................. JP2019-211055

(51) Int. Cl.
*H04L 29/08* (2006.01)
*H04L 7/00* (2006.01)
*H04L 67/12* (2022.01)

(52) U.S. Cl.
CPC ............ *H04L 7/0033* (2013.01); *H04L 67/12* (2013.01)

(58) Field of Classification Search
CPC ....... H04L 7/0033; H04L 67/12; H04J 3/0638
See application file for complete search history.

(56) References Cited

U.S. PATENT DOCUMENTS

2008/0183525 A1* 7/2008 Tsuji ...................... G06Q 10/10
705/7.18
2017/0308853 A1 10/2017 Tsuji et al.

FOREIGN PATENT DOCUMENTS

JP 2005007154 A * 1/2005
JP 5160818 B2 3/2013

* cited by examiner

*Primary Examiner* — Kim T Nguyen
(74) *Attorney, Agent, or Firm* — Oliff PLC

(57) ABSTRACT

A communication system includes: a plurality of sensor terminals each including a clock indicating an individual time and configured to detect sensing information related to a user and information detection time at which the sensing information has been detected; a management terminal configured to retain a reference time and adapted to communicate with the plurality of sensor terminals; and a relationship analysis unit configured to analyze a relationship among the users of the plurality of sensor terminals, in which the management terminal acquires the sensing information and the information detection time from each of the plurality of sensor terminals and corrects the information detection time acquired from each of the plurality of sensor terminals based on a lag between the individual time acquired from the corresponding sensor terminal and the reference time, and the relationship analysis unit analyzes the relationship using the sensing information and the corrected information detection time.

6 Claims, 8 Drawing Sheets

COMMUNICATION SYSTEM AND CONTROL METHOD

CROSS REFERENCE TO RELATED APPLICATIONS

This application is based upon and claims the benefit of priority from Japanese patent application No. 2019-211055, filed on Nov. 22, 2019, the disclosure of which is incorporated herein in its entirety by reference.

BACKGROUND

The present disclosure relates to a communication system and a control method.

Conventionally, a communication system for acquiring and analyzing records of a communication has been known. For example, Patent Literature 1 (Japanese Patent No. 5160818) discloses a communication system including a plurality of wearable sensor terminals (terminals), a management terminal (a base station) capable of performing data communication with the sensor terminals, and a relationship analysis unit (an application server) that calculates a value of a relationship among the users of the sensor terminals using sensing information acquired from the plurality of sensor terminals by the management terminal.

SUMMARY

In the communication system disclosed in Patent Literature 1, a process of synchronizing the individual time on each clock of the sensor terminals with a reference time retained by the management terminal is performed at the sensor terminals by having the sensor terminals communicate with the management terminal. However, with such a configuration, it takes time for the plurality of sensor terminals to complete synchronization of their times, thus causing a delay in the system start-up, which leads to degradation in the usability of the system.

The present disclosure has been made in view of the problem mentioned above and an object thereof is to provide a highly convenient communication system.

A communication system according to a first exemplary aspect includes:

a plurality of sensor terminals each including a clock indicating an individual time and configured to detect sensing information related to a user and information detection time at which the sensing information has been detected;

a management terminal configured to retain a reference time and adapted to communicate with the plurality of sensor terminals; and a relationship analysis unit configured to analyze a relationship among the users of the plurality of sensor terminals, in which the management terminal acquires the sensing information and the information detection time from each of the plurality of sensor terminals and corrects the information detection time acquired from each of the plurality of sensor terminals based on a lag between the individual time acquired from the corresponding sensor terminal and the reference time, and the relationship analysis unit analyzes the relationship using the sensing information and the corrected information detection time.

In the communication system according to the first exemplary aspect, time synchronization for the times of the plurality of sensor terminals is not performed at the time of the system start-up, and instead the information acquisition time is corrected by the management terminal based on the aforementioned lag when the sensing information and data of the sensing information acquisition time are transmitted to the management terminal. With such a configuration, it is possible to swiftly start-up the system, and thus the convenience of the system can be enhanced.

Further, the sensor terminals may be configured to start detection of the sensing information and the information detection time before establishing communication with the management terminal.

Further, the management terminal can be configured to update the lag on a real-time basis.

Furthermore, when communication with at least one of the plurality of sensor terminals is disconnected and thereafter restored, the management terminal may update the lag at the sensor terminal where the communication has been disconnected.

A method according to a second exemplary aspect is a method of controlling a communication system that includes:

a plurality of sensor terminals each including a clock indicating an individual time and configured to detect sensing information related to a user and information detection time at which the sensing information has been detected;

a management terminal configured to retain a reference time and adapted to communicate with the plurality of sensor terminals; and a relationship analysis unit configured to analyze a relationship among the users of the plurality of sensor terminals, the method including the steps of:

acquiring, at the management terminal, the individual time from each of the plurality of sensor terminals;

acquiring, at the management terminal, the sensing information and the information detection time from each of the plurality of sensor terminals;

correcting, at the management terminal, the information detection time acquired from each of the plurality of sensor terminals based on a lag between the individual time acquired from the corresponding sensor terminal and the reference time; and analyzing, at the relationship analysis unit, the relationship using the sensing information and the corrected information detection time.

According to the present disclosure, a highly convenient communication system can be provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinbelow, the present disclosure is explained through the embodiments, however the disclosure according to the claims is not limited to the embodiments mentioned below. Further, not all of the configurations described in the embodiments are necessary as the means of solving the problem. For clarifying the explanation, the following description and the drawings are partially omitted and simplified where appropriate. The same symbols are assigned to the same elements throughout the drawings and duplicated explanations are omitted as necessary.

First Embodiment

Figure 1:
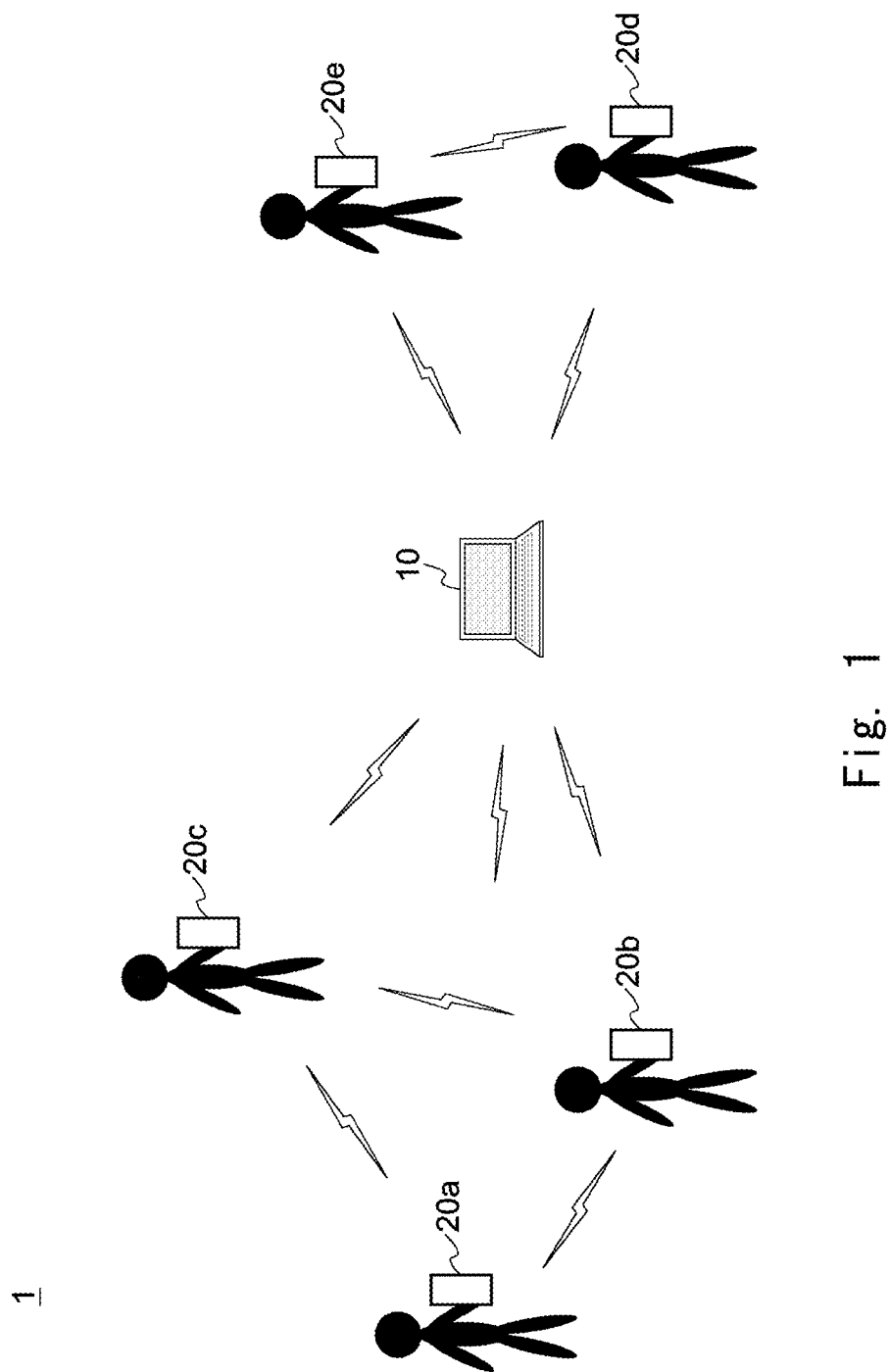
FIG. 1 is a schematic diagram showing a communication system according to a first embodiment.

FIG. 1 is a schematic diagram showing a communication system 1 according to a first embodiment. The communication system 1 is a system for analyzing a relationship among the users of a plurality of sensor terminals. The communication system 1 includes a management terminal 10 and a plurality of sensor terminals 20*a* to 20*e*. The management terminal 10 and the plurality of sensor terminals 20*a* to 20*e* can perform data communication with each other by radio communication such as Bluetooth (registered trademark) etc. which is in conformity with a radio communication standard. Note that data communication can also be performed with each other among the plurality of sensor terminals 20*a* to 20*e* by the radio communication.

The management terminal 10 retains a reference time and can communicate with the plurality of sensor terminals 20*a* to 20*e*. Specific examples of the management terminal 10 include various devices such as a PC having a radio communication function, a tablet terminal device, a laptop computer, and a smartphone.

Each of the plurality of sensor terminals 20*a* to 20*e* has a clock indicating an individual time (hereinafter referred to as an "individual time"). Further, each of the plurality of sensor terminals 20*a* to 20*e* detects sensing information related to a user and an information detection time at which the sensing information has been detected. Here, the sensing information is, for example, the information of the surrounding sound including the user's speech and the sound pressure information of the surrounding sound including the user's speech. Further, the sensing information may be information related to the movement (action) of the user. The plurality of sensor terminals 20*a* to 20*e* may start detection of the sensing information and the information detection time before establishing communication with the management terminal 10. Specific examples of the plurality of sensor terminals 20*a* to 20*e* include various transportable devices such as a wearable terminal device having the radio communication function. Note that for the sake of explanation, only five sensor terminals 20*a* to 20*e* are shown in FIG. 1, however, any number of sensor terminals can be used.

Figure 2:
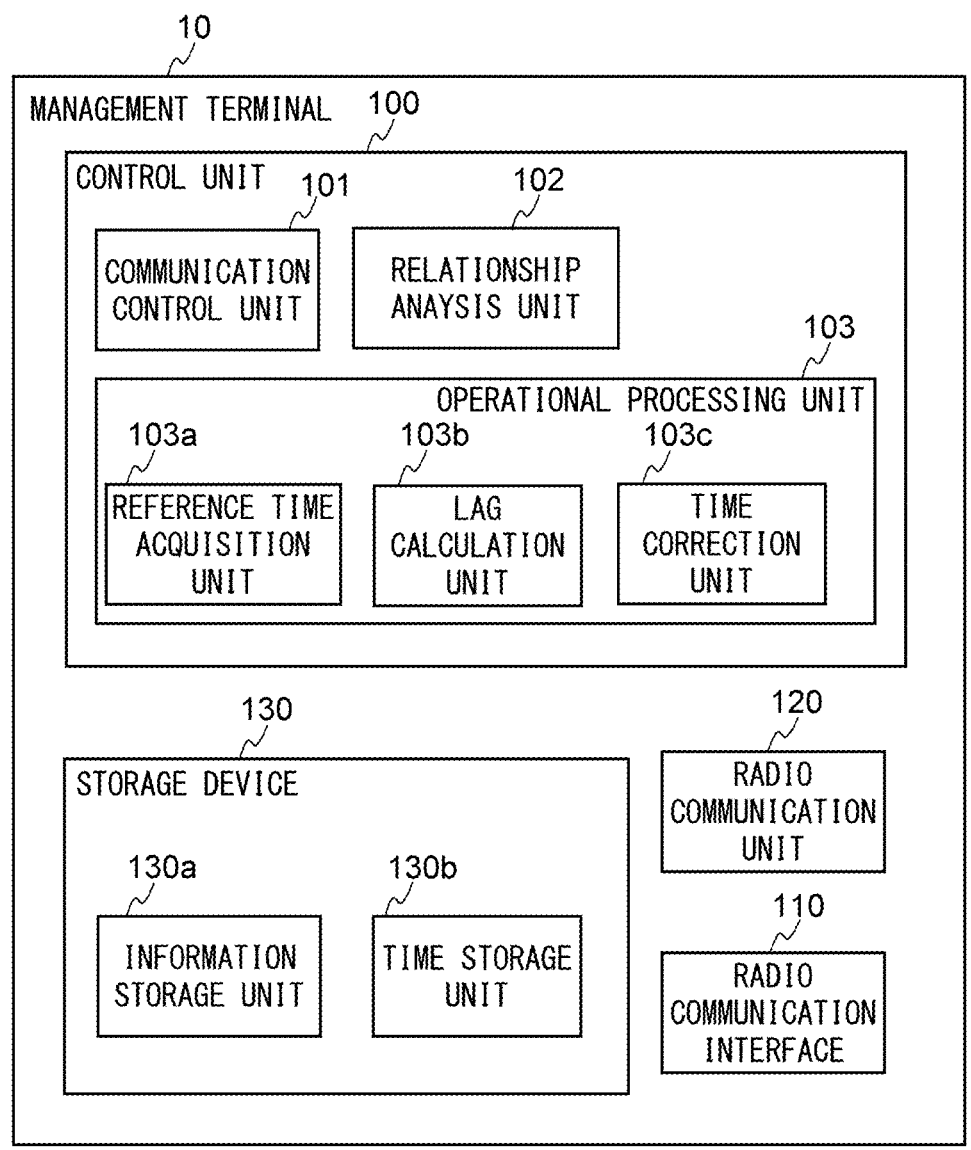
FIG. 2 is a block diagram showing a detailed configuration of a management terminal of the communication system according to the first embodiment.

FIG. 2 is a block diagram showing a detailed configuration of the management terminal 10 according to the first embodiment. The management terminal 10 includes a control unit 100, a radio communication interface 110, a radio communication unit 120, and a storage device 130.

The control unit 100 is a processor such as a CPU (Central Processing Unit) that controls electronic circuits and devices of the management terminal 10. The control unit 100 develops various programs in a RAM (Random Access Memory) (not shown) for execution. The control unit 100 includes a communication control unit 101, which is a program module, a relationship analysis unit 102, and an operational processing unit 103.

The communication control unit 101 is a program module that controls radio communication established with the plurality of sensor terminals 20*a* to 20*e*. The communication control unit 101 establishes radio communication with the plurality sensor terminals 20*a* to 20*e*. Further, the communication control unit 101 acquires the sensing information and the information detection time from the plurality of sensor terminals 20*a* to 20*e* and stores them in the storage device 130.

The operational processing unit 103 includes a reference time acquisition unit 103*a*, a lag calculation unit 103*b*, and a time correction unit 103*c*. The reference time acquisition unit 103*a* retains an accurate time as the reference time. That is, the reference time acquisition unit 103*a* acquires the accurate time such as the standard time by, for example, accessing the internet on a real-time basis, and retains the acquired accurate time as the reference time.

The lag calculation unit 103*b* calculates the lag between the individual time transmitted from each of the plurality of sensor terminals 20*a* to 20*e* and the reference time. Note that the calculation of the lag between the individual time of each sensor terminal and the reference time includes creation of a time-correspondence map. The time-correspondence map is a map indicating a relationship between the individual time of the sensor terminal and the reference time. Details of the time-correspondence map are described later. Further, the lag calculation unit 103*b* stores the calculated lag in the storage device 130 in association with the corresponding sensor terminals 20*a* to 20*e*. Note that the lag calculation unit 103*b* may calculate the lag each time the individual time is transmitted thereto and update the lag stored in a time storage unit 130*b* on a real-time basis. Furthermore, when communication with at least one of the plurality of sensor terminals 20*a* to 20*e* is disconnected and thereafter restored, the lag calculation unit 103*b* may update the lag at the sensor terminal where the communication has been disconnected.

The time correction unit 103*c* acquires the sensing information and the information detection time from each of the plurality of sensor terminals 20*a* to 20*e* and corrects the information detection time acquired from each of the plurality of sensor terminals 20*a* to 20*e* based on the lag in the corresponding sensor terminal.

A relationship analysis unit 104 analyzes the relationship among the users of the plurality of sensor terminals 20*a* to 20*e* using the sensing information and the corrected information detection time. The relationship among the users include, for example, the contents of the speeches of the users of the plurality of sensor terminals 20*a* to 20*e*, a social relationship that is assumed from the difference in the frequency of each user's speech made in a conversation etc.

The radio communication interface 110 is an interface that controls the radio data communication established with the plurality of sensor terminals 20a to 20e. The radio communication interface 110 can perform radio data communication using radio waves of a bandwidth of 2.4 GHz or the like.

The radio communication unit 120 is an electronic circuit that performs data transmission/reception via the radio communication interface 110. The radio communication unit 120 includes a transmission/reception circuit. When various data are received from the plurality of sensor terminals 20a to 20e via the radio communication interface 110, the transmission/reception circuit provides these data to the control unit 100.

The storage device 130 is a storage device that stores various data and programs. The storage device 130 includes an information storage unit 130a and the time storage unit 130b. The information storage unit 130a stores the sensing information and the information detection time acquired from each of the plurality of sensor terminals 20a to 20e. The time storage unit 130b stores the lag calculated by the lag calculation unit 103b in association with the corresponding sensor terminals 20a to 20e. The information detection time stored in the information storage unit 130a is corrected based on the lag calculated by the lag calculation unit 103b and then updated to the corrected information detection time.

Figure 3:
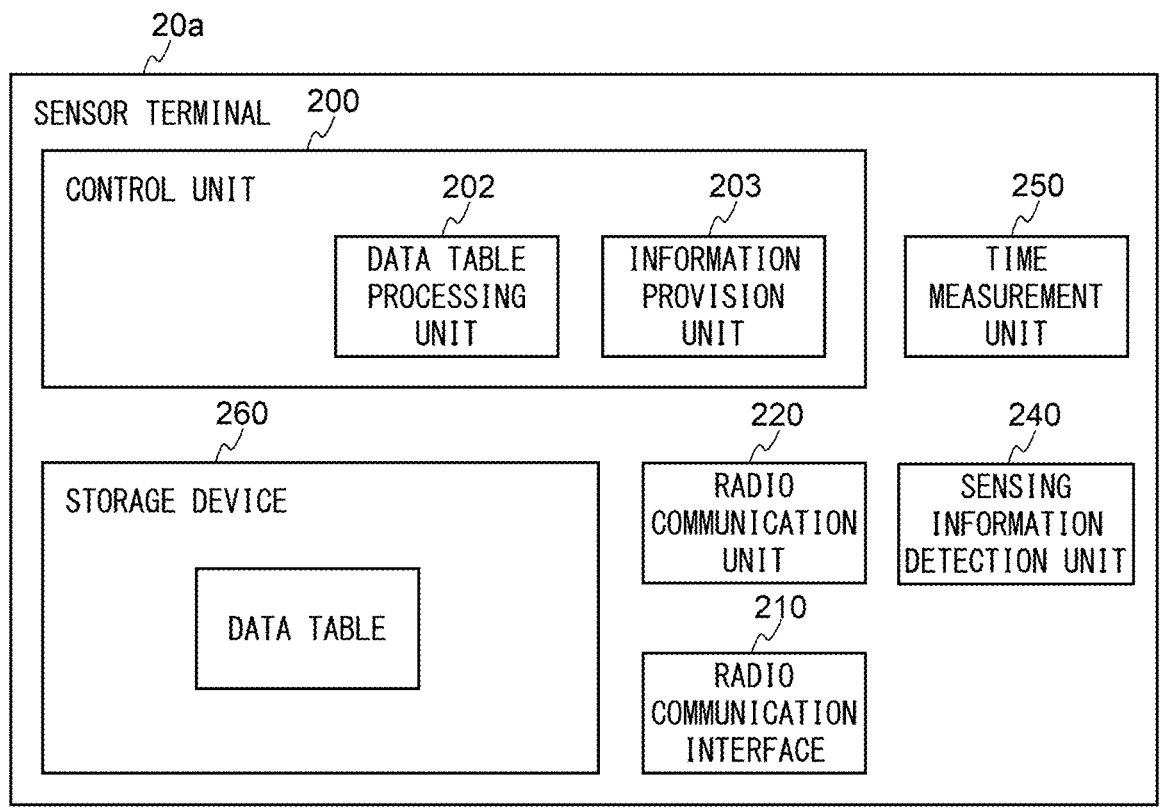
FIG. 3 is a block diagram showing a detailed configuration of a sensor terminal of the communication system according to the first embodiment.

FIG. 3 is a block diagram showing a detailed configuration of the sensor terminal 20a. Hereinbelow, the configuration of the sensor terminal 20a is described with reference to FIG. 3. Note that the sensor terminals 20b to 20e have the same configuration as that of the sensor terminal 20a, and thus detailed description thereof is omitted.

The sensor terminal 20a includes a control unit 200, a radio communication interface 210, a radio communication unit 220, a sensing information detection unit 240, a time measurement unit 250, and a storage device 260.

The control unit 200 is a processor such as a microcomputer or the like that controls electronic circuits and devices of the sensor terminal 20a. The control unit 200 includes a data table processing unit 202 and an information provision unit 203.

The data table processing unit 202 is a program module that processes a data table configured in the storage device 260. The data table processing unit 202 stores the sensing information in association with the information detection time at which the sensing information has been detected in the information table.

The information provision unit 203 is a program module that provides the individual time to the management terminal 10 and the sensing information and the information detection time to the management terminal 10 by radio communication. The information provision unit 203 transmits these information to the management terminal 10 on a regular basis.

The radio communication interface 210 is a device that controls the radio data communication established with the management terminal 10. The radio communication interface 210 can perform radio data communication using radio waves of a bandwidth of 2.4 GHz or the like.

The radio communication unit 220 is an electronic circuit that performs data transmission/reception via the radio communication interface 210. The radio communication unit 220 can transmit various data to the management terminal 10 via the radio communication interface 210 under the control of the control unit 200.

The sensing information detection unit 240 is a device that detects the sensing information. The sensing information detection unit 240 includes a microphone when the sensing information is the information of the surrounding sound including the user's speech and the sound pressure information of the surrounding sound including the user's speech. The sensing information detection unit 240 includes an acceleration sensor when the sensing information is the movement of the user. The sensing information detection unit 240 provides the detected sensing information to the data table processing unit 202.

The time measurement unit 250 is an electronic circuit that measures the current time. Here, the current time refers to an individual time of each of the plurality of sensor terminals. The time measurement unit 250 provides the individual time in accordance with requests from the data table processing unit 202 and the information provision unit 203. The information provision unit 203 provides the individual time provided from the time measurement unit 250 to the management terminal 10.

The storage device 260 is a storage device in which the sensing information, data such as the information detection time, and various programs are stored.

Next, a flow of the processes for analyzing the relationship among the users of the plurality of sensor terminals is explained.

Figure 4:
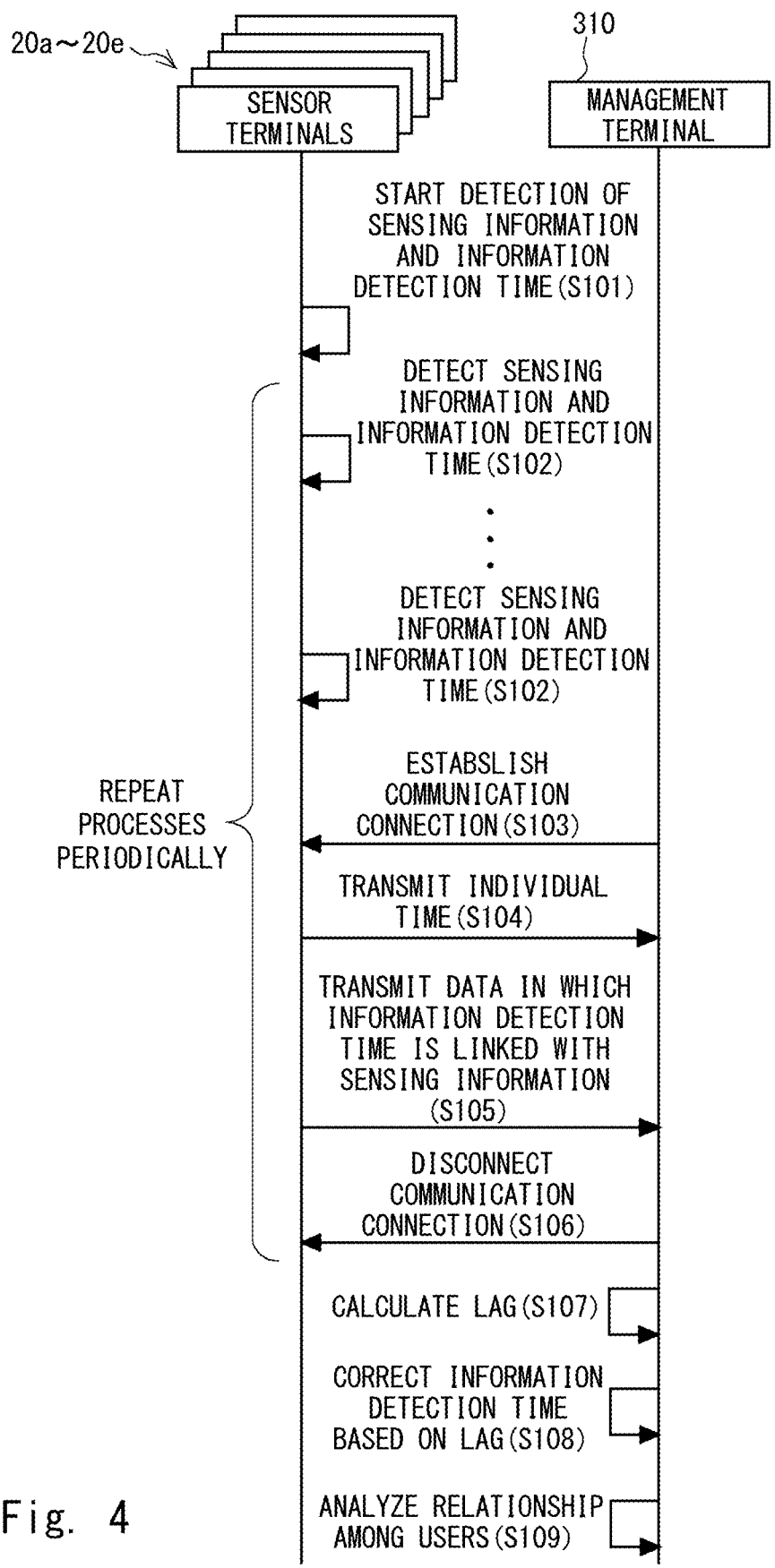
FIG. 4 is a sequence chart showing a flow of processes for analyzing a relationship among the users of a plurality of sensor terminals in the communication system according to the first embodiment.

FIG. 4 is a sequence chart showing the flow of the processes for analyzing the relationship among the users of the plurality of sensor terminals. As shown in FIG. 4, in the plurality of sensor terminals 20a to 20e, a power switch is turned on and detection of the sensing information and the information detection time is started (Step S101). Next, the sensing information and the information detection time are detected (Step S102). Note that in each of the sensor terminals 20a to 20e, once the detection of the sensing information is started, it is repeated periodically.

Following Step S102, a management terminal 310 establishes a communication connection with the plurality of sensor terminals 20a to 20e (Step S103). Next, the individual time is transmitted from each of the plurality of sensor terminals 20a to 20e to the management terminal 310 (Step S104). Next, the data (the data table) in which the information detection time is linked with the sensing information is transmitted from the plurality of sensor terminals 20a to 20e to the management terminal 310 (Step S105). Next, the management terminal 310 disconnects the communication connection established with the plurality of sensor terminals 20a to 20e (Step S106). Note that the processes from Step S102 to Step S106 may be repeated periodically.

Following Step S106, the lag between the individual time transmitted from each of the plurality of sensor terminals 20a to 20e and the reference time is calculated (Step S107). Next, the information detection time acquired from each of the plurality of sensor terminals 20a to 20e is corrected based on the lag in the corresponding sensor terminal (Step S108). Next, the relationship among the users is analyzed using the sensing information and the corrected information detection time (Step S109).

Figure 5:
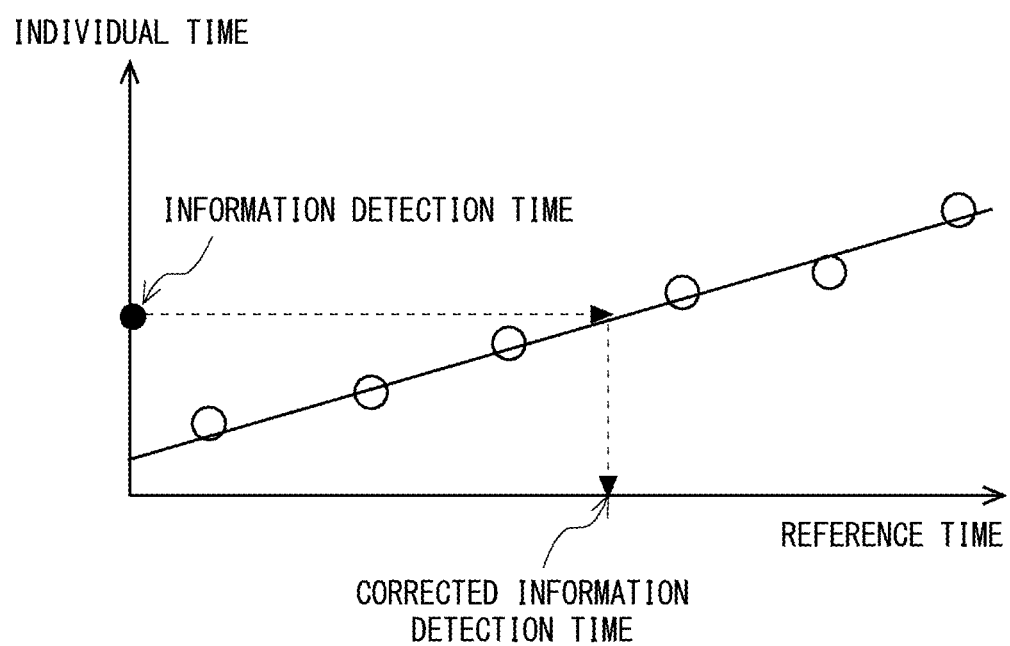
FIG. 5 is a diagram for explaining an example of a method of creating a time-correspondence map of the sensor terminals of the communication system according to the first embodiment.

Calculation of the lag between the individual time and the reference time in Step S107 of FIG. 4 may be performed by creating a time-correspondence map indicating the correspondence between the individual time and the reference time. FIG. 5 is a diagram for explaining an example of a method of creating a time-correspondence map of the sensor terminal 20a. Note that the method of creating the time-correspondence maps of the sensor terminals 20b to 20e is the same as that of the sensor terminal 20a, and thus detailed descriptions thereof are omitted.

Five sets of data of the individual time of the sensor terminal 20a and the corresponding reference time are assumed to have been obtained. As shown in FIG. 5, these data are plotted on a graph in which the horizontal axis defines the reference time and the vertical axis defines the individual time of the sensor terminal 20a. Then, a straight line with the minimum squares error is obtained by using the least squares method with respect to the sets of data of the individual time of the sensor terminal 20a and the corresponding reference time. Using the time-correspondence map created as described above, the information detection time of the sensor terminal 20a is corrected. With such a configuration, variations in the lag between the individual time and the corresponding reference time caused by the communication delay can be suppressed.

The reference time corresponding to the individual time is a reference time at which the management terminal 10 has received the individual time. Thus, when a communication delay occurs in transmitting the individual time from the sensor terminal 20a to the management terminal 10, the lag between the individual time and the reference time becomes larger. Therefore, when the individual time that has been acquired when there was a significant communication delay is included in creating the time-correspondence map, accuracy of the calculated lag lowers. On the other hand, the accuracy of the calculated lag is ensured by, for example, the algorithm described below.

(1) When the radio field intensity of the radio waves of the radio communication emitted by the sensor terminal 20a is equal to or larger than a certain value, a set of the individual time and the reference time is recorded. On the other hand, when the radio field intensity of the radio waves of the radio communication emitted by the sensor terminal is smaller than the certain value, the acquired individual time is discarded.

(2) When the individual time is transmitted from the sensor terminal 20a to the management terminal 10, the re-transmission function of the radio communication is not used. (This is because if the reception of the individual time fails once and then the same individual time is re-transmitted, the difference between the individual time and the reference time becomes large.)

(3) The delay time in the communication between the sensor terminal 20a and the management terminal 10 is measured in advance through an experiment. In the creation of the time-correspondence map described above, the acquired individual time that has been delayed by an average communication delay time obtained through an experiment is used as the individual time.

As described above, in the communication system 1 according to the present embodiment, the management terminal 10 calculates the lag between the individual time transmitted from each of the plurality of sensor terminals 20a to 20e and the reference time. Then, the information detection time acquired from each of the plurality of sensor terminals 20a to 20e is corrected based on the lag in the corresponding sensor terminal, and the relationship among the users is analyzed using the sensing information and the corrected information detection time. That is, in the communication system 1, time synchronization for the times of the plurality of sensor terminals 20a to 20e is not performed at the time of the system start-up, and instead the information acquisition time is corrected by the management terminal based on the aforementioned lag when the sensing information and data of the sensing information acquisition time are transmitted to the management terminal. With such a configuration, it is possible to swiftly start-up the system, and thus the convenience of the system can be enhanced.

Embodiment 2

Figure 6:
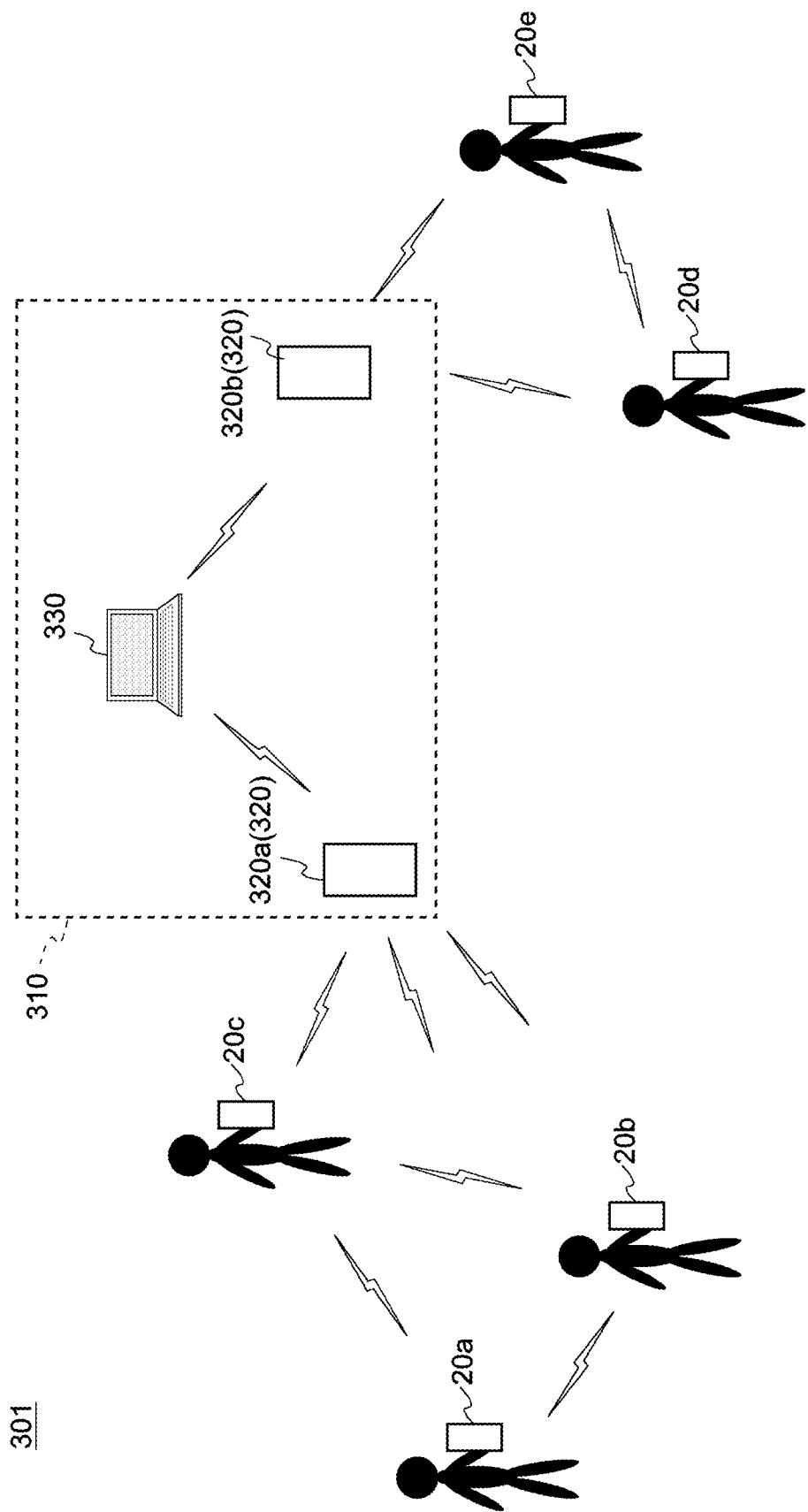
FIG. 6 is a schematic diagram showing a communication system according to a second embodiment.

FIG. 6 is a schematic diagram showing a communication system 301 according to a second embodiment. The communication system 301 includes the management terminal 310 and the plurality of sensor terminals 20a to 20e. The difference between the communication system 301 according to the second embodiment and the communication system 1 according to the first embodiment is that in the communication system 301, the management terminal 310 is separated into a repeater 320 and a data server 330. With this configuration, the repeater 320 that extracts data of the plurality of sensor terminals 20a to 20e can be disposed at several points.

The repeater 320 and the plurality of sensor terminals 20a to 20e can perform data communication with each other by radio communication such as Bluetooth (registered trademark) etc. which is in conformity with a radio communication standard. The repeater 320 is disposed in plural number, i.e., a repeater 320a, a repeater 320b, and so on. Note that although in FIG. 6, only two repeaters 320a and 320b are shown for the sake of explanation, an arbitrary number of repeaters can be used. For example, when a group of the plurality of sensor terminals 20a to 20c and a group of the sensor terminals 20d and 20e are spaced apart from each other, the repeater 320a performs radio communication with the plurality of sensor terminals 20a to 20c and the repeater 320b performs radio communication with the sensor terminals 20d and 20e. The data server 330 and the repeaters 320 can perform data communication with each other by the radio communication. Further, the plurality of sensor terminals 20a to 20e can perform data communication with each other by the radio communication.

The data server 330 is a device that processes information provided from the plurality of sensor terminals. Specific examples of the data server 330 include various devices such as a PC having a radio communication function, a tablet terminal device, a laptop computer, and a smartphone. Further, the data server 330 may be configured in, for example, a cloud system.

Figure 7:
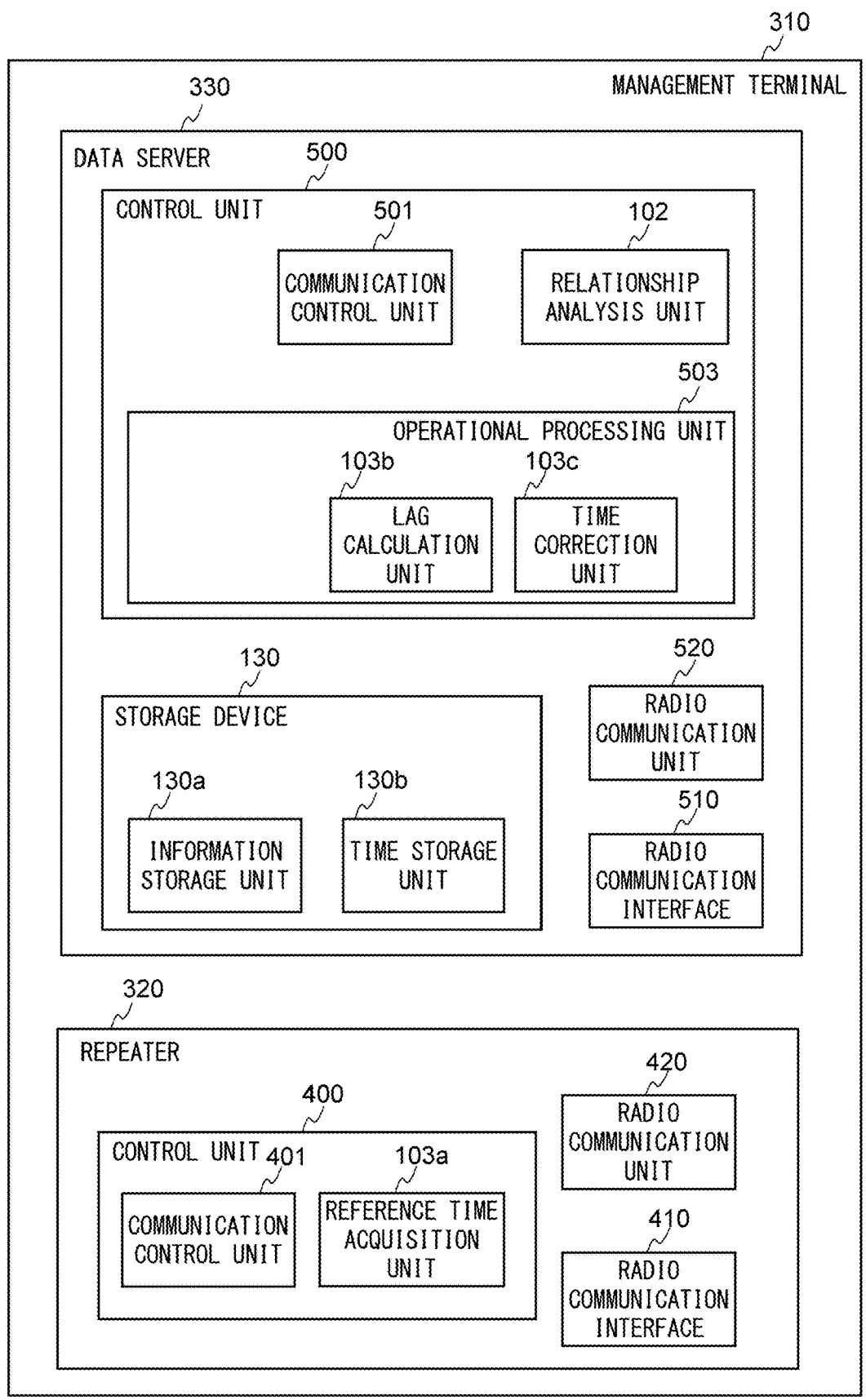
FIG. 7 is a block diagram showing a detailed configuration of a management terminal of the communication system according to the second embodiment.

FIG. 7 is a block diagram showing a detailed configuration of the management terminal 310 of the communication system according to the second embodiment. The management terminal 310 includes the repeater 320 and the data server 330.

The repeater 320 is a device for transmitting data from each of the plurality of sensor terminals 20a to 20e to the data server 330. The repeater 320 includes a control unit 400, a radio communication interface 410, and a radio communication unit 420.

The control unit 400 executes various programs by developing them in a RAM (not shown). The control unit 400 includes a communication control unit 401, which is a program module, and the reference time acquisition unit 103a. The communication control unit 401 is a program module that controls the radio communication established with the plurality of sensor terminals 20a to 20e and the radio communication established with the data server 330. The communication control unit 401 establishes the radio communication with the plurality of sensor terminals 20a to 20e and also establishes the radio communication with the data server 330.

The radio communication interface 410 is an interface that controls the radio data communication established between the communication control unit 401 and the plurality of sensor terminals 20a to 20e and the radio data communication established between the communication control unit 401 and the data server 330. The radio communication interface 410 can perform radio data communication using radio waves of a bandwidth of 2.4 GHz or the like.

The radio communication unit 420 is an electronic circuit that performs data transmission/reception via the radio communication interface 410. The radio communication unit 420 includes a transmission/reception circuit. Upon receiving various data from the plurality of sensor terminals 20a to 20e via the radio communication interface 410, the transmission/reception circuit transmits these data to the control unit 400. Further, the transmission/reception circuit can transmit various data to the data server 330 via the radio communication interface 410 under the control of the control unit 400.

The data server 330 includes a control unit 500, a radio communication interface 510, a radio communication unit 520, and the storage device 130.

The control unit 500 is an operation device such as a CPU or the like that controls electronic circuits and devices of the data server 330. The control unit 500 executes various programs by developing them in a RAM (not shown). The control unit 500 includes a communication control unit 501, which is a program module, the relationship analysis unit 102, and an operational processing unit 503.

The communication control unit 501 is a program module that controls the radio communication established with the repeaters 320. The communication control unit 501 establishes the radio communication with the repeaters 320. Further, the communication control unit 501 acquires the sensing information and the information detection time from the plurality of sensor terminals 20a to 20e via the repeaters 320 and stores them in the storage device 130. The operational processing unit 503 includes the lag calculation unit 103b and the time correction unit 103c.

The radio communication interface 510 is an interface that controls the radio data communication established with the repeaters 320. The radio communication interface 510 can perform radio data communication using radio waves of a bandwidth of 2.4 GHz or the like.

The radio communication unit 520 is an electronic circuit that performs data transmission/reception via the radio communication interface 510. The radio communication unit 120 includes a transmission/reception circuit. The transmission/reception circuit receives various data from the repeaters 320 via the radio communication interface 510 and transmits these data to the control unit 500.

Next, a flow of the processes for analyzing the relationship among the users of the plurality of sensor terminals is explained.

Figure 8:
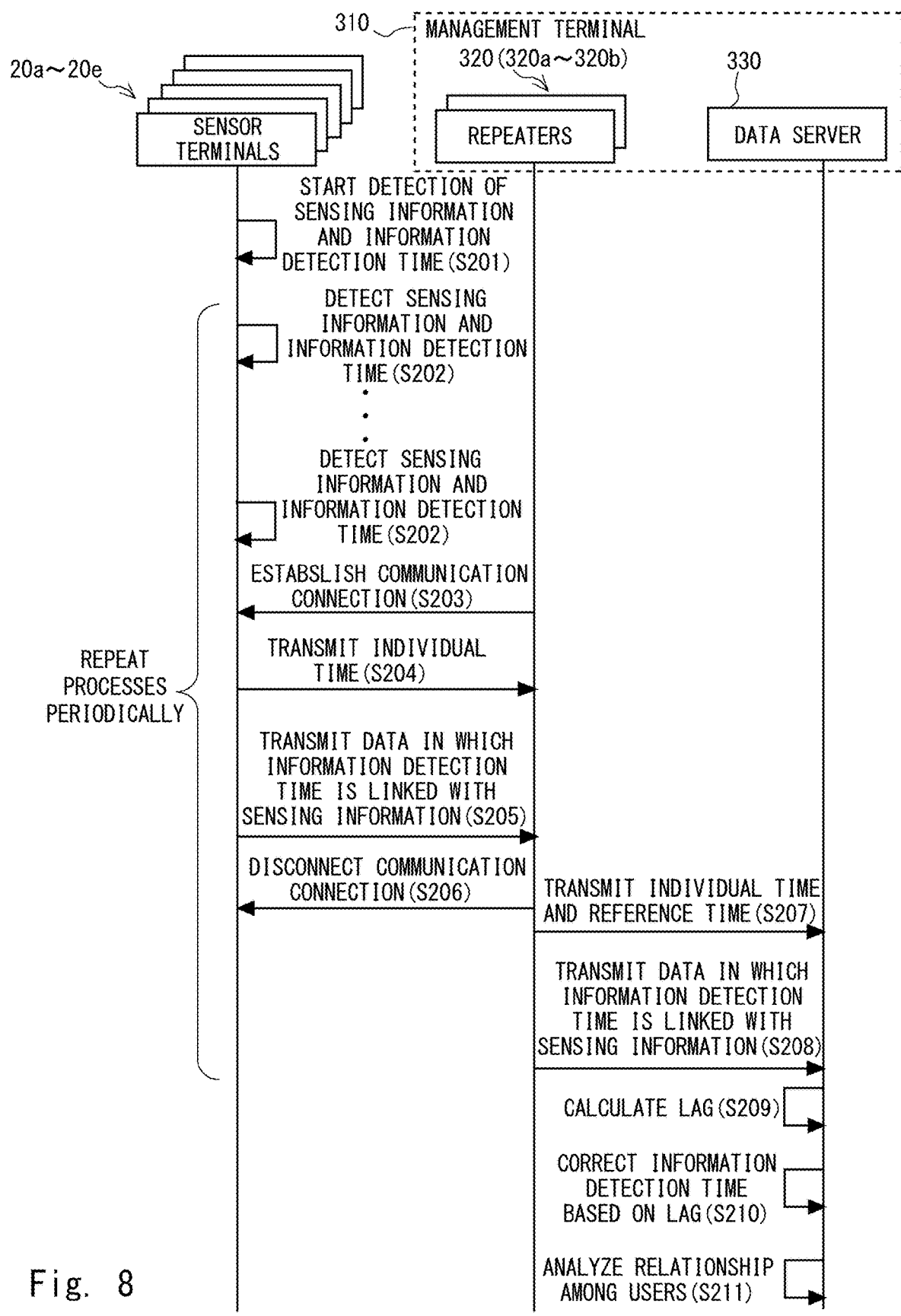
FIG. 8 is a sequence chart showing a flow of processes for analyzing a relationship among the users of a plurality of sensor terminals in the communication system according to the second embodiment.

FIG. 8 is a sequence chart showing the flow of the processes for analyzing the relationship among the users of the plurality of sensor terminals. As shown in FIG. 8, in the plurality of sensor terminals 20a to 20e, a power switch is turned on and detection of the sensing information and the information detection time is started (Step S201). Next, the sensing information and the information detection time are detected (Step S202). Note that in each of the sensor terminals 20a to 20e, once the detection of the sensing information is started, it is repeated periodically.

Following Step S202, the repeaters 320 (320a, 320b) establish a communication connection with the plurality of sensor terminals 20a to 20e (Step S203). Next, the individual time is transmitted from each of the plurality of sensor terminals 20a to 20e to the repeaters 320 (320a, 320b) (Step S204). Next, the data (the data table) in which the information detection time is linked with the sensing information is transmitted from the plurality of sensor terminals 20a to 20e to the repeaters 320 (320a, 320b) (Step S205). Next, the repeaters 320 (320a, 320b) disconnect the communication connection with the plurality of sensor terminals 20a to 20e (Step S206).

Following Step S206, the individual time of each of the plurality of sensor terminals 20a to 20e and the reference time are transmitted from the repeaters 320 (320a, 320b) to the data server 330 (Step S207). Next, the data (the data table) in which the information detection time is linked with the sensing information is transmitted from the repeaters 320 (320a, 320b) to the data server 330 (Step S208). Note that the processes from Step S202 to Step S208 may be repeated periodically.

Following Step S208, the lag between the individual time transmitted from each repeater 320 and the reference time is calculated (Step S209). Next, the information detection time acquired from each of the plurality of sensor terminals 20a to 20e is corrected based on the lag in the corresponding sensor terminal (Step S210). Next, the relationship among the users is analyzed using the sensing information and the corrected information detection time (Step S211).

As described above, by separating the management terminal 310 into the repeater 320 and the data server 330, the repeater 320 can be disposed at several points whereby data of the sensor terminals can be acquired across a wider region.

In the examples described above, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

The present disclosure is not limited to the embodiments described above and can be modified as appropriate without departing from the gist of the present disclosure. For example, the communication system according to the present embodiment has been described to have a configuration in which the management terminal includes the relationship analysis unit, however, the relationship analysis unit may be included in another device different from the management terminal in the communication system.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A communication system comprising:
a plurality of sensor terminals each including a clock indicating an individual time and configured to detect sensing information related to a user and an information detection time at which the sensing information has been detected;

a management terminal configured to retain a reference time and adapted to communicate with the plurality of sensor terminals; and a relationship analysis unit configured to analyze a relationship among users of the plurality of sensor terminals, wherein the management terminal acquires the sensing information and the information detection time from each of the plurality of sensor terminals and corrects the information detection time acquired from each of the plurality of sensor terminals based on a lag between the individual time acquired from a corresponding sensor terminal and the reference time, when a radio field intensity of radio waves of radio communication emitted by the sensor terminal is greater than or equal to a threshold value, a set of the individual time and the reference time is recorded, when the radio field intensity of the radio waves of the radio communication emitted by the sensor terminal is less than the threshold value, the acquired individual time is discarded, and the relationship analysis unit analyzes the relationship using the sensing information and the corrected information detection time.

2. The communication system according to claim 1, wherein the plurality of sensor terminals start detection of the sensing information and the information detection time before establishing communication with the management terminal.

3. The communication system according to claim 1, wherein the management terminal updates the lag between the individual time and the reference time on a real-time basis.

4. The communication system according to claim 1, wherein when communication with at least one of the plurality of sensor terminals is disconnected and thereafter restored, the management terminal updates the lag between the individual time and the reference time at the at least one of the plurality of sensor terminals where the communication has been disconnected.

5. A method of controlling a communication system that comprises:

a plurality of sensor terminals each including a clock indicating an individual time and configured to detect sensing information related to a user and an information detection time at which the sensing information has been detected;

a management terminal configured to retain a reference time and adapted to communicate with the plurality of sensor terminals; and a relationship analysis unit configured to analyze a relationship among users of the plurality of sensor terminals, the method comprising:

acquiring, at the management terminal, the individual time from each of the plurality of sensor terminals;

acquiring, at the management terminal, the sensing information and the information detection time from each of the plurality of sensor terminals;

correcting, at the management terminal, the information detection time acquired from each of the plurality of sensor terminals based on a lag between the individual time acquired from a corresponding sensor terminal and the reference time, wherein when a radio field intensity of radio waves of radio communication emitted by the sensor terminal is greater than or equal to a threshold value, a set of the individual time and the reference time is recorded, and when the radio field intensity of the radio waves of the radio communication emitted by the sensor terminal is less than the threshold value, the acquired individual time is discarded; and analyzing, at the relationship analysis unit, the relationship using the sensing information and the corrected information detection time.

6. A non-transitory computer readable medium storing a computer program for causing a computer to perform the method according to claim 5.

* * * * *